United States Patent
Wixson

(10) Patent No.: US 6,303,920 B1
(45) Date of Patent: Oct. 16, 2001

(54) METHOD AND APPARATUS FOR DETECTING SALIENT MOTION USING OPTICAL FLOW

(75) Inventor: Lambert Ernest Wixson, Rocky Hill, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/434,028

(22) Filed: Nov. 4, 1999

Related U.S. Application Data

(60) Provisional application No. 60/109,050, filed on Nov. 19, 1998, and provisional application No. 60/135,045, filed on May 20, 1999.

(51) Int. Cl.$^7$ .................................................. H01L 27/00
(52) U.S. Cl. ...................................... 250/208.1; 250/221
(58) Field of Search ................................. 250/280.1, 221, 250/222.1, 203.1, 559.29, 559.32; 356/375; 340/541, 555–557

(56) References Cited

U.S. PATENT DOCUMENTS 5,627,905 * 5/1997 Sebok et al. ..................... 382/107

* cited by examiner

Primary Examiner—Que T. Le
(74) Attorney, Agent, or Firm—William J. Burke

(57) ABSTRACT

Method and apparatus for detecting salient motion in an image sequence using optical flow. For each pixel in an image, frame-to-frame optical flow information are collected over time for computing a rough estimate of the total image distance traveled by each pixel. Specifically, an optical flow field is generated for every two successive image frames. The resulting optical flow field is applied to warp one or more intermediate measure images that contain intermediate cumulative measurements. The warped measure images for an image sequence are used to compute a sum of frame-to-frame optical flow fields for the image sequence to yield a cumulative flow field that can be used to generate a measure of salience for each image point.

20 Claims, 5 Drawing Sheets

METHOD AND APPARATUS FOR DETECTING SALIENT MOTION USING OPTICAL FLOW

This application claims the benefit of U.S. Provisional Applications No. 60/109,050 filed on Nov. 19, 1998 and No. 60/135,045 filed on May 20, 1999, which are herein incorporated by reference.

This invention was made with U.S. government support under contract number DAAB 09-97-C-J031. The U.S. government has certain rights in this invention.

The present invention relates to an apparatus and concomitant method for image processing. More particularly, this invention relates to a method and apparatus that detects salient motion, i.e., motion with a sense of direction in an image sequence.

BACKGROUND OF THE INVENTION

Motion information, e.g., salient motion detection, plays an important role in many vision based applications or systems such as surveillance and targeting systems. Salient motion is defined to be motion that tends to move in a consistent direction over time. However, in a given situation, some motion based information is relevant to the tasks at hand, while other motion based information simply provides competing detail. Namely, image motion can arise from "noninteresting" objects as well as "interesting" ones.

For example, surveillance-defined detection and tracking tasks can benefit from certain types of visual motion, while being hampered by other types of visual motion. Depending on the specific scene conditions, the difficulty of these tasks can vary widely. Some of the more challenging domains are those in which motion is being exhibited not just by the "salient" objects or objects of interest (e.g., a person or vehicle traveling with a sense of direction through a scene), but also by other "non-salient" objects (e.g., the scintillation of specularities on water, or the oscillation of vegetation in the wind). Non-salient motions of this type are a common source of false positives for most simple motion-detection schemes, which either detect areas of frame-to-frame intensity change, or areas of intensity change with respect to some reference representation. Although the reference representation can also be a learned probability distribution of intensities at each pixel, and such a system can, over time, learn not to report non-salient changes, it will still give rise to false positives for some time until the reference representation has been learned.

Therefore, a need exists in the art for a method and apparatus for detecting salient motion.

SUMMARY OF THE INVENTION

The present invention is a method and apparatus for detecting salient motion in an image sequence using optical flow. Namely, for each pixel in an image, frame-to-frame optical flow information are collected over time for computing a rough estimate of the total image distance traveled by each pixel.

More specifically, an optical flow field is generated for every two successive image frames. The optical flow field is defined as a two-dimensional (2D) vector at each pixel location. In turn, the resulting optical flow field is applied to warp one or more intermediate measure images that contain intermediate cumulative measurements, thereby aligning these measure images with the current image. Finally, the flow fields for an image sequence are used to compute a sum of frame-to-frame optical flow fields for the image sequence to yield a cumulative flow field that can be used to generate a measure of salience for each image point. The measure of salience will provide insight as to whether an image point is part of a salient object or part of a non-salient object. In other words, the resulting salience measure allows a motion detection method and apparatus to distinguish salient objects from non-salient objects. In turn, such information is very important in surveillance or targeting applications, where it is very desirable to track and monitor salient objects.

Additionally, various alternate embodiments of the present invention are also disclosed. Specifically, variations in the computation of the flow field and salience measure are provided to address different image conditions.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
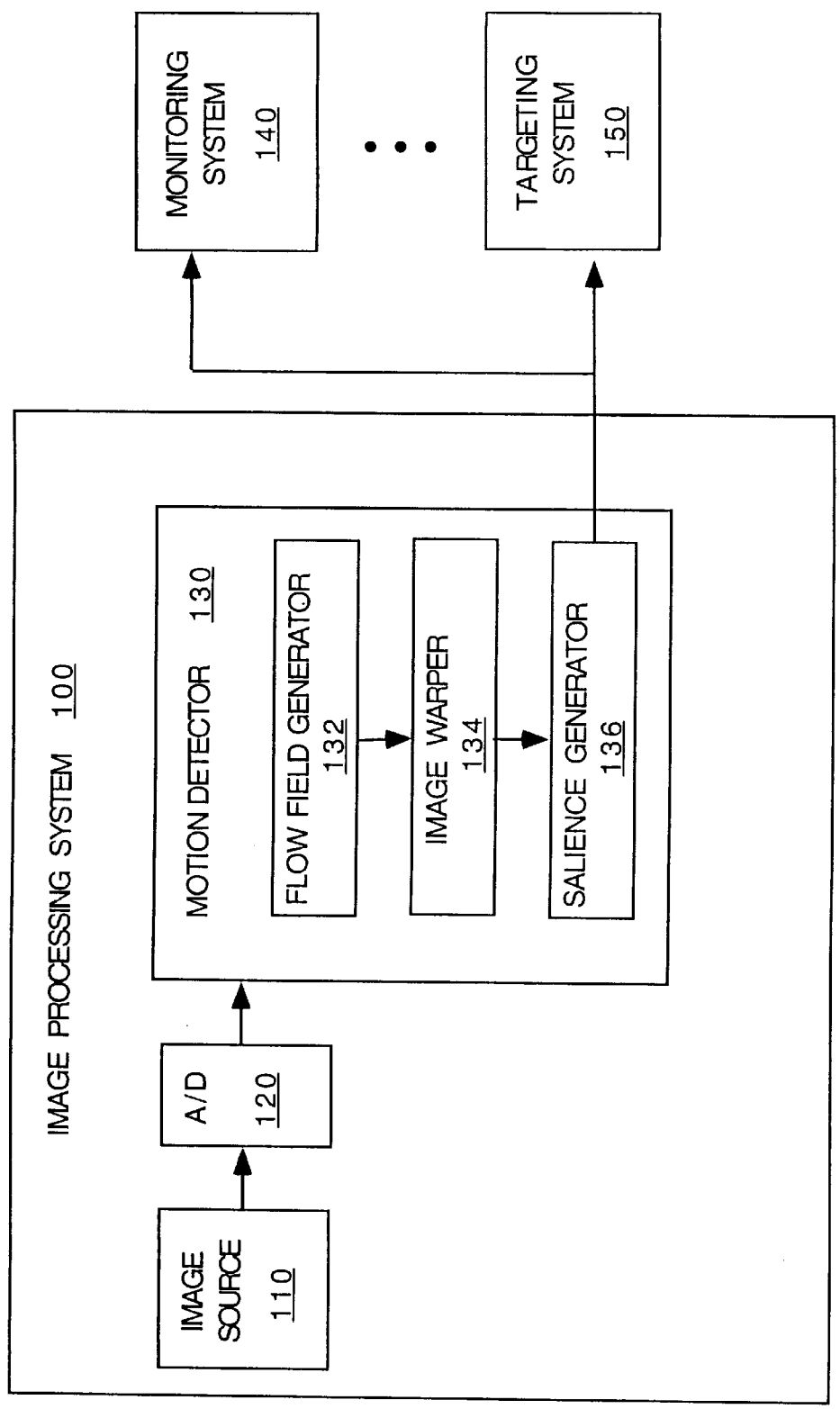
FIG. 1 illustrates a block diagram of an image processing system of the present invention.

FIG. 1 illustrates a block diagram of an image processing system 100 that forms one illustrative embodiment of the present invention. The present image processing system 100 is designed to detect salient motions within a scene represented by a sequence of images.

Specifically, the image processing system 100 comprises an image source 110, an analog to digital (A/D) converter 120 and a motion detector 130. It is presumed that the image sequence originated as an analog video signal from an image source 110 (e.g., a camera, video cassette recorder (VCR), video disk player, infrared camera and the like). The analog image signal is then digitized by the A/D converter 120 into a digitized image signal. However, if the image source has been previously digitized and stored in a storage medium, then the retrieved image sequence can be forwarded directly to the motion detector 130, thereby bypassing the A/D converter.

The motion detector 130 is tasked with the detection of salient motion in accordance with the present invention. The motion detector 130 comprises a flow field generator 132, an image warper 134 and a salience measure generator 136. The salience measure generated by the motion detector 130 is a gauge for determining whether salient motion was detected in an image sequence, i.e., whether a salient object (one or more pixels) was detected. Such salient motion information can be forwarded and used by other systems such as a monitoring system 140 for tracking or detecting moving objects, or a targeting system 150 for targeting a weapon on a moving object. In fact, any number of other vision-based systems can benefit from the salient motion information generated by the motion detector 130 of the present invention.

The motion detector 130 is tasked with detecting motions whose frame-to-frame magnitude is larger than a certain very small threshold (typically 1 pixel). This is achieved by integrating frame-to-frame optical flow data so that for each pixel, it is possible to compute a rough estimate of the total image distance it has moved over time. Thus, the salience of a person moving in one direction will increase; whereas, the salience of a tree branch moving back and forth will fluctuate between two opposite-signed distances.

Specifically, flow field generator 132 generates a frame-to-frame flow field (motion description) from two successive image frames. Let an image at time t be denoted as either $I_t$ or, when it is necessary to denote a specific image point p, $I_t(p)$. Since the computation of the salience measure accepts as input a set of frame-to-frame optical flow fields, a plurality of frame-to-frame flow fields are generated by the flow field generator 132 for an image sequence.

Figure 2:
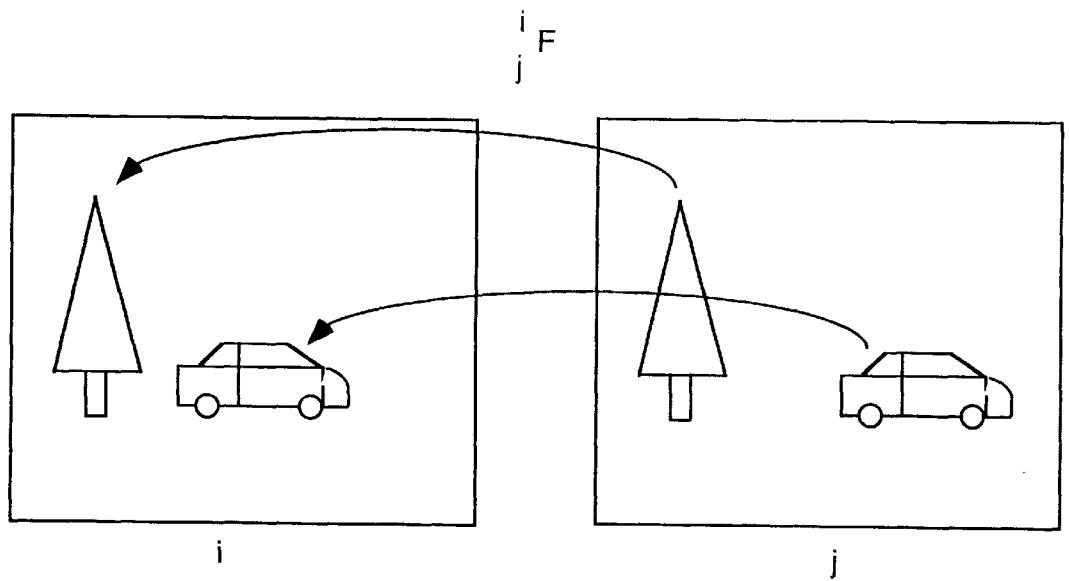
FIG. 2 illustrates a representation and notation for the flow fields of the present invention.

Let $F(p)=(F_x(p),F_y(p))$ denote an optical flow vector field that defines a 2D vector at each pixel location $p=[x, y]$. Specifically, given two images $I_i$ and $I_j$, the optical flow field that maps each pixel in $I_i$ to a coordinate in $I_j$ will be denoted as $_j^iF$ as illustrated in FIG. 2. Conversely, flow field $_j^iF$ maps coordinates in image $I_i$ to image $I_j$. (It should be noted that when F has been computed to subpixel precision, then the x' and y' components of p' will not be integer values. Therefore, $I_t(p')$ must be computed using image interpolation, e.g., bilinear interpolation or other methods as disclosed by G. Wolberg in "Digital Image Warping". IEEE Computer Society Press, 1992.

In operation, the flow is computed using a multi-resolution least squares technique, e.g., as disclosed by Bergen et al., in "Hierarchical Model-Based Motion Estimation", Proceedings of the European Conference on Computer Vision, 1992. It should be noted that there are other variations of this technique with better accuracy that can be employed to compute the flow. However, since in general the motion in the scene will be complicated and non-rigid, it is unlikely that the specifics of the flow estimation will significantly impact the present invention.

Nevertheless, certain situations such as occlusion and insufficient texture in an image frame may create difficult conditions for recovering perfect flow vectors. Namely, in locations where there is occlusion, where the temporal sampling used for digitization is not fast enough to keep up with motion in the scene, or where there is insufficient texture, the computed flow vectors can be incorrect. To address these conditions, an optional flow processing step can be implemented.

More specifically, such potentially incorrect flow vectors are identified between two frames t and t+1 by performing "forwards-backwards checking" using the flow fields $_{t+1}^tF$ and $^{t+1}_tF$. The forwards-backwards checking examines whether the flow vectors in the two flow fields map to the same points. If not, the flow vector is set to a value of 0. (Cl More specifically, $$_{t+1}^tF(p)$$

is reset to [0 0], if $$\|_{t+1}^t F(p) + {_t^{t+1}}F(p + {_{t+1}^t}F(p))\| > k_c,$$

i.e., the two flow vectors should cancel each other. The constant $k_c$ is the pixel distance by which the two flow vectors can differ. Generally, when flow vectors are incorrect, this distance will be large. Thus, in one embodiment, $k_c$ is set equal to 3 and has been noted to produce adequate checking. Nevertheless, $k_c$ can be changed to be adapted to a particular implementation or types of image sequence to be processed.

Once the flow field is generated, image warper 134 applies a warping function using the flow field to generate a new image. Specifically, the flow field can be used to warp an image $I_t(p)$ to yield a new image (a warped image). The result of applying the warp function at all pixel locations p shall be written as warp(I, F). Let the function that performs such a warp be denoted as:

$$\text{warp}(I, F, p) = I(p') \qquad (1)$$

where $p'=p+F(p)$.

The warp function also can be used to warp a 2D vector field V. In this case, the warp function is applied to each component of the vector field individually:

$$\text{warp}(V, F, p) = \begin{bmatrix} \text{warp}(V_x F, p) \\ \text{warp}(V_y, F, p) \end{bmatrix} \qquad (2)$$

For images taken at two successive time instances t and t+1, the flow field $_{t+1}^tF$ can be used to warp $I_t$ into alignment with $I_{t+1}$, yielding a new image.

Figure 3:
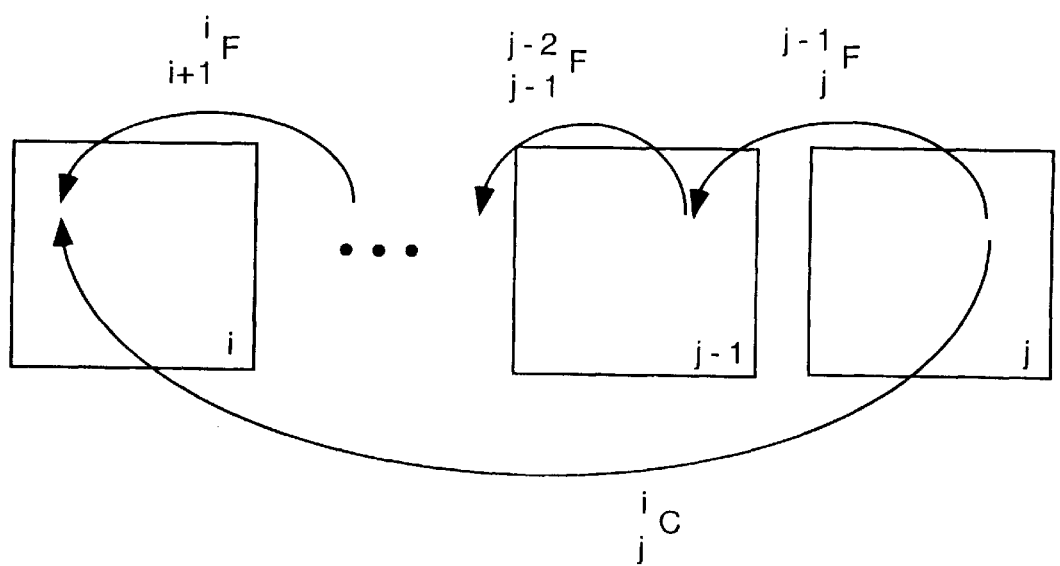
FIG. 3 illustrates a representation and notation for the cumulative flow field of the present invention.

In turn, the flow fields are used by the salience measure generator 136 to detect salient motion. Given perfect frame-to-frame fields and perfect image warping, one can track an image point from $I_i$ to $I_j$ by using the frame-to-frame flow fields $_{t+1}^tF$ for t=I, . . . ,j−1. More specifically, the frame-to-frame flow fields could be combined into a "cumulative" flow field $_j^iC$, as shown in FIG. 3. In other words, the sum of the frame-to-frame optical flow fields for all frames from $I_i$ to $I_j$ yields the cumulative flow field $_j^iC$. This can be defined as:

$$_j^iC = \begin{cases} _j^iF & \text{if } j = i+1 \\ \Delta_j + \text{warp}(_{j-1}^iC, _j^{j-1}F) & \text{if } j > i+1 \end{cases} \qquad (3)$$

where $\Delta_j$ is the contribution to the cumulative flow of the frame-to-frame flow from frame j−1 to frame j. Namely, $\Delta_j$ is simply $_j^{j-1}F$, but this may change for the measures as discussed below.

The cumulative flow field defined above can be used to measure the distance between each image point's location in a reference image $I_i$ and its location in a subsequent image $I_j$. The goal is to use this cumulative flow field to measure the distance traveled by each image point, and to use this distance as a measure of salience.

Figure 4:
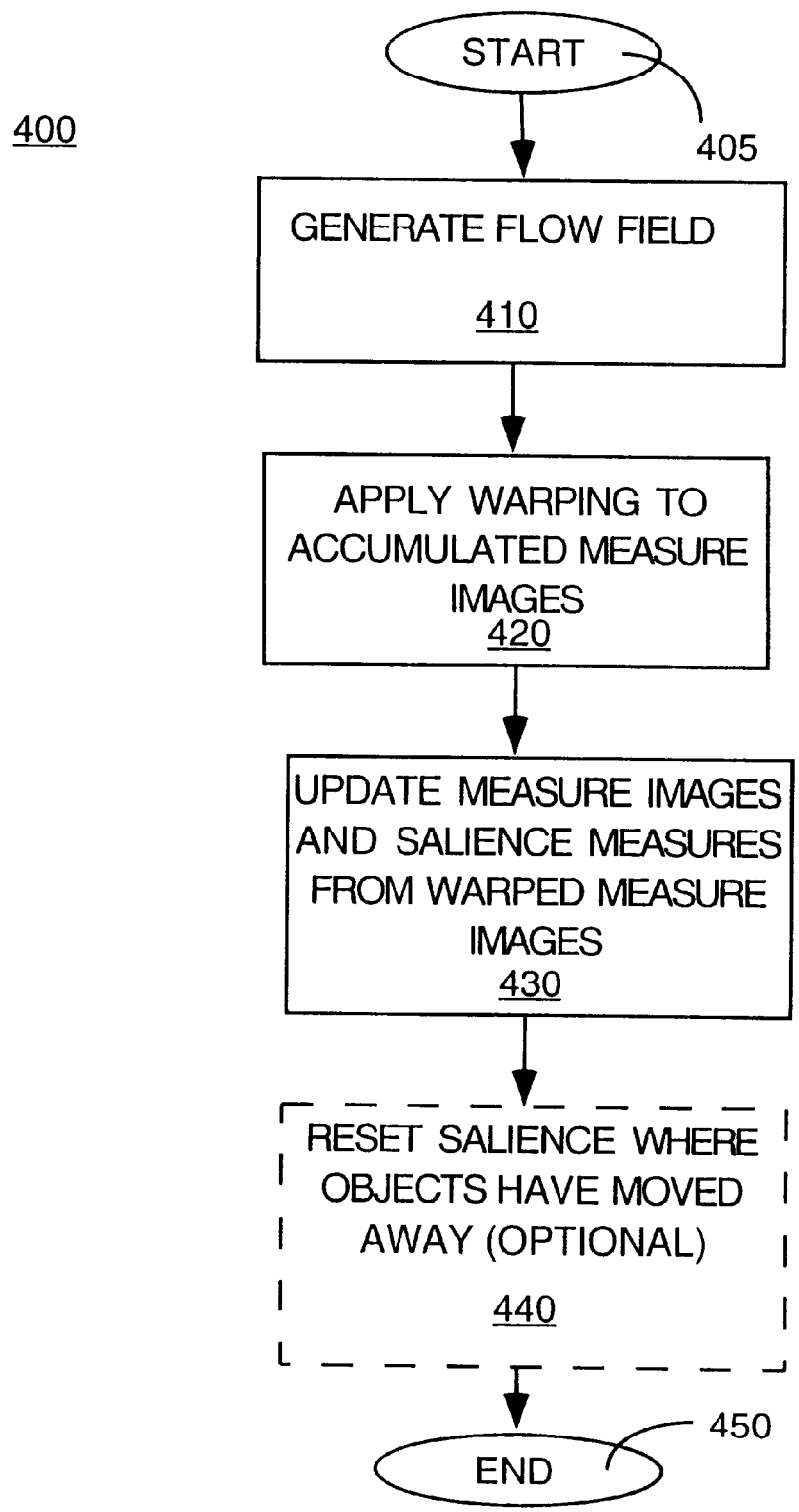
FIG. 4 illustrates a flow chart of a method for generating a measure of salience of the present invention.

FIG. 4 illustrates a flow chart of a method 400 that summarizes the process of generating a measure of salience of the present invention, given a new image or video frame. Namely, it should be understood that method 400 is described below as an iterative process as each new successive image arrives and is processed.

Method 400 starts in step 405 and proceeds to step 410 where method 400 generates a flow field between a newly arrived frame and a preceding frame, e.g., between every two successive frames in an image sequence. In generating the flow field, method 400 may optionally execute the "forwards-backwards checking" method as described above.

In step 420, the resulting flow field is used to update the cumulative flow field in accordance with the above equations (1) and (2). In general, the computation of a salience measure requires the accumulation, over multiple frames, of a number of intermediate measures (intermediate accumulated motion descriptions), also represented as images. For example, one such intermediate measure is the cumulative flow field. Because these measures are associated with individual pixels in the most recent video frame, when a new frame is obtained, the measure images must be warped so that they align with the positions to which their associated pixels have moved in the new frame. This is performed in step 420 by warping these measures images to align with the new image in accordance with equations (1) and (2).

In step 430, method 400 uses the warped measure images to compute a salience measure (cumulative flow) in accordance with the above equation (3) to detect salient motion. Namely, the salience measure is applied to detect salient objects (one or more pixels in the image sequence). A threshold is predefined such that any pixel having a salience measure greater than the threshold constitutes a salient pixel. It should be noted that the threshold setting is generally application-specific, but a threshold that is set to approximately twice the salience that is observed from a particular camera when the non-salient objects, e.g., vegetation in the camera's field of view, is blowing in a strong wind should provide the desired performance.

Method 400 may optionally resets the salience in step 440 to address various issues such as "salience streaking" as discussed below. This step can be implemented if salience streaking is a problem in a particular application. Method 400 then ends in step 450 or returns to step 410 for a next frame in the image sequence.

Although using the cumulative flow field as the basis of a salience measure can be employed, it has been observed that improvements can be made to improve the accuracy and effectiveness of the salience measure generator 136. Namely, several alternate embodiments described below have been found to be more robust in the computation of salience.

Thus, in one alternate embodiment, a variation on the cumulative flow measure is presented that accumulates the distance that each point travels in a consistent x- or y-direction, and then relates this to a measure of salience. This salience measure will also be a vector field over the image, and will be denoted $S_j$.

The revised cumulative measure will have two properties. First, it should take on values that, for each point, are proportional to the distance that point has traveled in a consistent x- or y- direction. Second, since a flow field is rarely perfect, and since a salient object may temporarily pass behind small occlusions, it is desirable to have the accumulation to be tolerant of small temporal gaps in the frame-to-frame tracking of a point where the frame-to-frame flow is incorrect.

Figure 5:
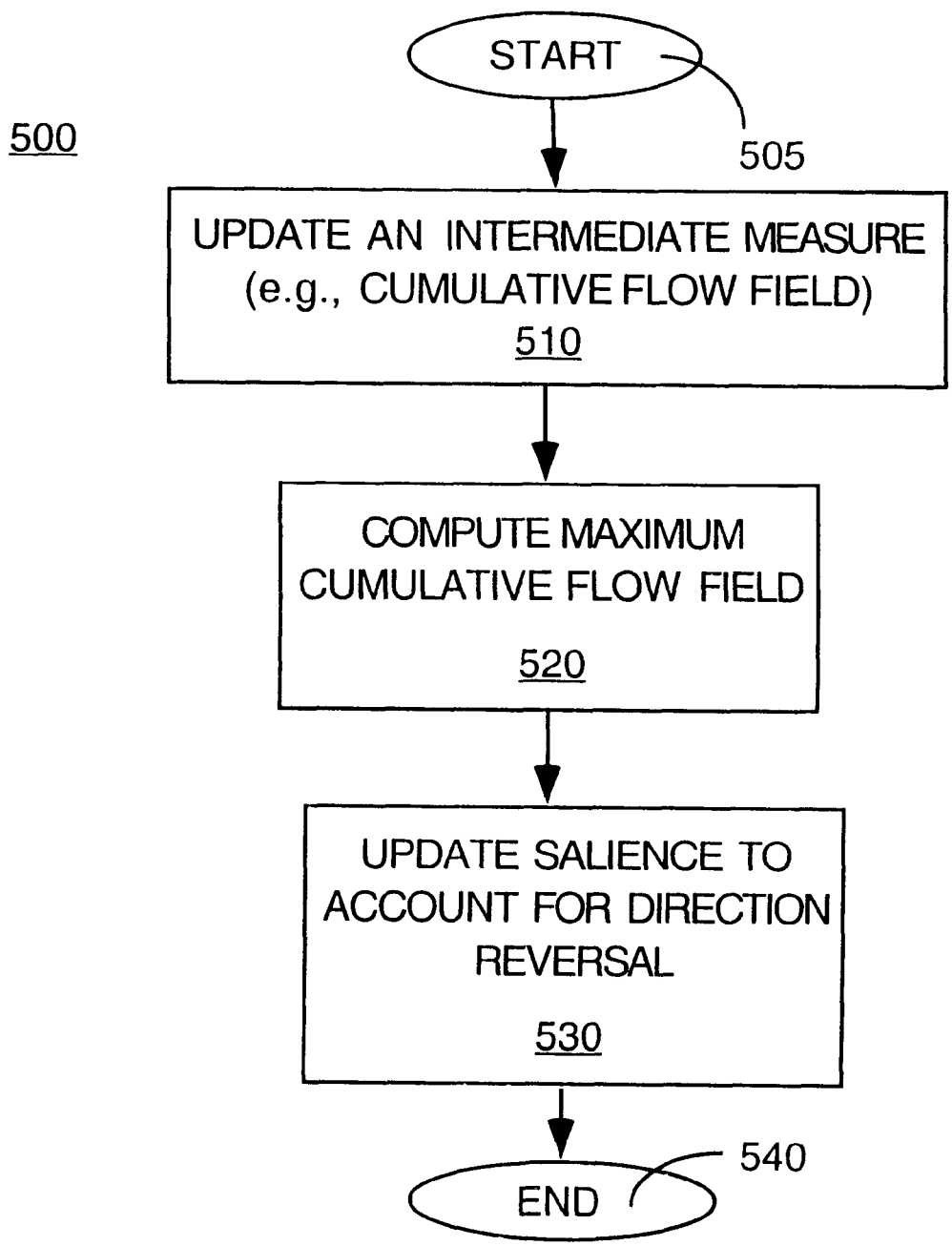
FIG. 5 illustrates a flow chart of an alternate method for generating a measure of salience of the present invention.

More specifically, FIG. 5 illustrates a flow chart of an alternate method 500 for generating a measure of salience of the present invention. Method 500 starts in step 505 and proceeds to step 510 where an intermediate measure, e.g., the cumulative flow field, is updated.

Specifically, a vector-valued salience measure $S_j$ is defined with the first property, i.e., it takes on values that for each point, are related to the distance that point has traveled in a consistent x- or y- direction. This measure is similar to the theoretical cumulative flow field, except that the system is augmented with a method of resetting the salience to a value of 0 when the direction of each tracked point's flow reverses course, and uses an "extended" flow field $_j^{j-1}E$ rather than the original flow field $_j^{j-1}F$ for each new frame j. The extended flow field is introduced to handle errors and occlusions that occur in real flow fields and is further explained below.

Thus, in step 510, method 500 updates the intermediate measure $S'_j$ in the same manner as the theoretical cumulative flow updating shown in equation (3), using the extended flow field:

$$S'_j := \begin{cases} 0 & \text{if } j = 0 \\ \Delta_j + warp(S_{j-1}, {}_j^{j-1}E) & \text{otherwise} \end{cases} \quad (4)$$

In step 520, method 500 computes a maximum cumulative flow field. The "x-" and "y-" components are updated separately. Specifically, a maximum cumulative flow field $M_j$ is computed by warping it from the previous frame and updating those locations at which the one component of the salience vector is directionally consistent with the maximum cumulative flow vector and has a larger magnitude than the corresponding component of the maximum cumulative flow vector. Specifically, the x-component of the maximum cumulative flow vector on frame j, $M_{j,x}$, is updated at each point p as follows. Let $m_x$ be the value of the x-component of the maximum cumulative flow vector at point p's location in the previous frame j−1, i.e., $m_x = M_{j-1,x}(p + {}_j^{j-1}E(p))$. Then:

$$M_{j,x}(p) := \begin{cases} S'_{j,x}(p) & \text{if } \text{sign}(S'_{j,x}(p)) = \text{sign}(m_x) \text{ and } |S'_{j,x}(p)| > |m_x| \\ m_x & \text{otherwise} \end{cases} \quad (5)$$

The y-component, $M_{j,y}$, is updated similarly.

In step 530, method 500 updates the salience measure to account for direction reversal. Specifically, method 500 detects direction reversals and resets the appropriate x- or y-component of the salience measure accordingly. The x-component of the salience measure, $S_{j,x}$, is assigned as follows:

$$S_{j,x}(p) := \quad (6)$$
$$\begin{cases} 0 & \text{if } |M_{j,x}(p)| > k_s \text{ and } |S'_{j,x}(p) - M_{j,x}(p)|/|M_{j,x}(p)| > k_r \\ S'_{j,x}(p) & \text{otherwise} \end{cases}$$

If $S_{j,x}(p)$ is reset to 0, $M_{j,x}(p)$ is also reset to 0.

The y-component of the salience measure, $S_{j,y}$, is computed similarly. Typically, the minimum salience $k_s$ is set to a value of 8 to ensure that some minimal salience has a chance to accumulate before it can be reset to a value of 0. The fractional change kr is typically set to 0.1, indicating that if the cumulative flow drops to 90% of the largest value previously observed, a direction change is occurring. The precise setting is not particularly important, since, in general, pixels on vegetation will exhibit direction reversals that represent large percentage changes relative to their maximum value. It should be noted that other values can be employed for $k_s$, and $k_r$ for a particular implementation. Method 500 then ends in step 540.

In sum, steps 520 and 530 of method 500 are implemented to detect locations that have reversed direction, and reset their salience to zero. Detecting direction reversals in a robust manner is very important, as it is common for a point's flow to reverse course slightly on some frames either due to errors in flow computation or occasional small backward movement. Therefore, to detect reversals in course, a "maximum salience" 2D vector field is maintained that holds for each point the maximum value of the x- and y-components that the point's salience has taken on since the salience at that point was last reset. Direction reversals are then detected when the salience of a point is above some threshold $k_s$, but below some fraction $k_r$ of its maximum salience. The salience is separately reset for motion in the x- and y-directions, so that the overall salience magnitude at a point is not reset to 0, if the point reverses course in one direction but not the other (for example a person zigzagging while running forward).

To achieve robustness to errors in computed flow and temporal gaps created when a moving object temporarily passes behind small occlusions, the salience measure is updated using an "extended" flow field $_j^{j-1}E$ rather than the original flow field $_j^{j-1}F$ for a new frame j as discussed above. The extended field is derived from the original by checking for each point p in the original flow field, whether there exists a scalar multiple s of the original vector $_j^{j-1}F(p)$ that extends the vector so that it connects to a location with large salience. More precisely, suppose $S_{j-1}$, the salience measure from the previous frame is obtained. Then the vector-valued salience measure g at point p's location in the previous frame, assuming an extension by a factor of s, is $g=S_{j-1}(p+ s_j^{j-1}F(p))$. A test is then employed to determine whether there exists an s>1 that meets the following five (5) criteria:

1. The flow vector to be extended must be large enough to be significant. Specifically, $\|_j^{j-1}F(p)\| \geq k_f$ where $k_f$ is a user-specified distance (typically 1).
2. The extended flow vector cannot be more than $k_e$ pixels longer than the original vector. Specifically, $\|s_j^{j-1}F(p) -_j^{j-1}F(p)\| < k_e$ where $k_e$ is a user-specified distance (typically 6).
3. The point to which the flow is to be extended must have a reasonably large salience. Specifically, $\|g\| \geq k_g$, where $k_g$ is a user-specified salience (typically 15).
4. The salience magnitude resulting from the extension must be more than the salience that would be obtained without an extension. Specifically, $\|g\| < \|S_{j-1}(p+_j^{j-1}F(p)) +_j^{j-1}F(p)\|$.
5. The vectors $_j^{j-1}F(p)$ and g must lie in the same quadrant (i.e., the signs of their components must be identical).

If all of the above criteria are met, then the s that maximizes $\|g\|$ is selected and assigned:

$$_j^{j-1}E(p) := s_j^{j-1}F(p) \tag{7}$$
$$\Delta_j(p) := 0$$

This has the effect of setting the flow vector to be the extended flow vector, but the salience update term to 0. This allows the salience value of the tracked point to remain the same as that of the point to which it has been linked by the extension, but not to increase. The motivation for this approach is that since the flow was not actually observed, it should not increment the salience.

If not all of the criteria for extending the flow vector are met, then the extended flow and salience update is identical to the original flow:

$$_j^{j-1}E(p) :=_j^{j-1}F(p) \tag{8}$$
$$\Delta_j(p) :=_j^{j-1}F(p)$$

By the definition of cumulative flow, pixels through which the object passes will retain indefinitely the cumulative flow that was possessed by the object when it passed through those pixels. This means that objects will leave a trail behind them, with varying degrees of salience. Depending on a particular application, such "salience streaking" may or may not be desirable as discussed below.

In many applications, it may be desirable to add a mechanism that allows the salience to either decay gradually over time or rapidly be set to 0 once the object has moved past. For example, this might be desirable if one wished to use the salience magnitude to delineate the object. The appropriate approach depends on the application.

One approach to rapidly reset salience to "0" once the object has moved past is to use non-maximum suppression. This method determines whether there exists another pixel p' within some distance $k_d$ whose frame-to-frame flow magnitude exceeds that of p by more than some factor $k_a$. If so, then $S_j(p)$ and $M_j(p)$ are reset to 0 before the next new frame is processed. The purpose behind this scheme is that if there is nearby motion that is substantially larger than the motion at this pixel, then this is likely to have happened because the object has moved off this image pixel. This approach usually provides good results.

To implement this adjustment, the salience can be adjusted in an optional post-processing step 440 as shown in FIG. 4. Let:

$$S_j = S_j \times \text{valid}(_j^{j-1}F) \tag{9}$$

with $$\text{valid}(F, x, y) = \begin{cases} 0 & \text{if } \exists (x'', y'') \text{ such that} \\ & |x'' - x| \leq k_d \text{ and} \\ & |y'' - y| \leq k_d \text{ and} \\ & \|F(x'', y'')\| / \|F(x, y)\| \\ & > k_s \\ 1 & \text{otherwise} \end{cases} \tag{10}$$

In one embodiment, $k_d$ and $k_s$ are set to 14 pixels and 5 pixels, respectively. However, it should be noted that other values can be used for $k_d$ and $k_s$ for a particular application.

The binary-valued function valid (F,x,y) serves to reset the salience at pixels that the object has just passed through. It returns 0 if there is a pixel (x", y") in the neighborhood of (x, y) where the magnitude of the flow $\|F(x'',y'')\|$ is significantly larger than $\|F(x,y)\|$. Otherwise, it returns 1.

However, there are some scenarios where this approach may not provide the desired performance. Consider, for example, an intruder crawling slowly beneath waving tree limbs. The proximity to the tree limbs may result in the suppression of the intruder's salience to some degree. To address such scenarios, additional variations may be necessary, such as basing the reset on whether the salience at p changes by some amount within a user-specified time window.

Finally, it is worth noting that alternative definitions of the function valid might be appropriate in various circumstances. Again using an intruder crawling slowly beneath waving tree limbs as an example, the proximity to the tree limbs may result in the suppression of the intruder's salience. Therefore, it may be useful to add the condition that the neighbor (x", y") must also have a reasonably similar salience measure to that at (x, y) if valid (F,x,y) is to be 0.

Additionally, salience could be reset at pixels that have recently been disoccluded. For example, disocclusion can be detected using a variation of left-right consistency checking from stereo methods, e.g., as disclosed by K. Konolige, in "Small Vision Systems: Hardware and Implementation", Int. Symp. Rob. Res., 1997, and by J. J. Little and W. E. Gillett, in "Direct Evidence For Occlusion In Stereo And Motion", Proc. ECCV, 1990.

The present invention outlines a salience measure that at each pixel is based on the straight-line distance that the pixel has moved in a consistent direction. Using this definition of salience $_j^iS$, the salience measures can be defined as a function of the total image distance a moving object travels. Specifically, a measure can be defined as the magnitude $\|S(x, y)\|$. For example, this measure can be used to trigger a detection alarm at a pixel (x, y), when the magnitude of the salience field exceeds a threshold. Significantly, this detection criterion is largely independence of image velocity. Examples have shown that objects moving in a straight line rapidly take on salience magnitudes that are significantly larger than that of vegetation. This suggests that for surveillance tasks, a detection alarm can be triggered at a pixel when the magnitude of its salience exceeds a threshold, and that a threshold can be chosen to significantly reduce false positives when compared to more conventional change detection schemes. This threshold can be adaptively set based on the expected amount of side-to-side movement of non-salient objects, e.g., vegetation in a particular scene or monitored area.

It should be noted that the present invention provide several advantages. The present invention does not need to explicitly detect and track hypothetical targets to assess their salience. It does not make assumptions about the size or intensity contrast of salient objects. Because it uses uiulti-resolution optical flow, it is applicable to a broad range of image velocities, and can even handle image stops.

Figure 6:
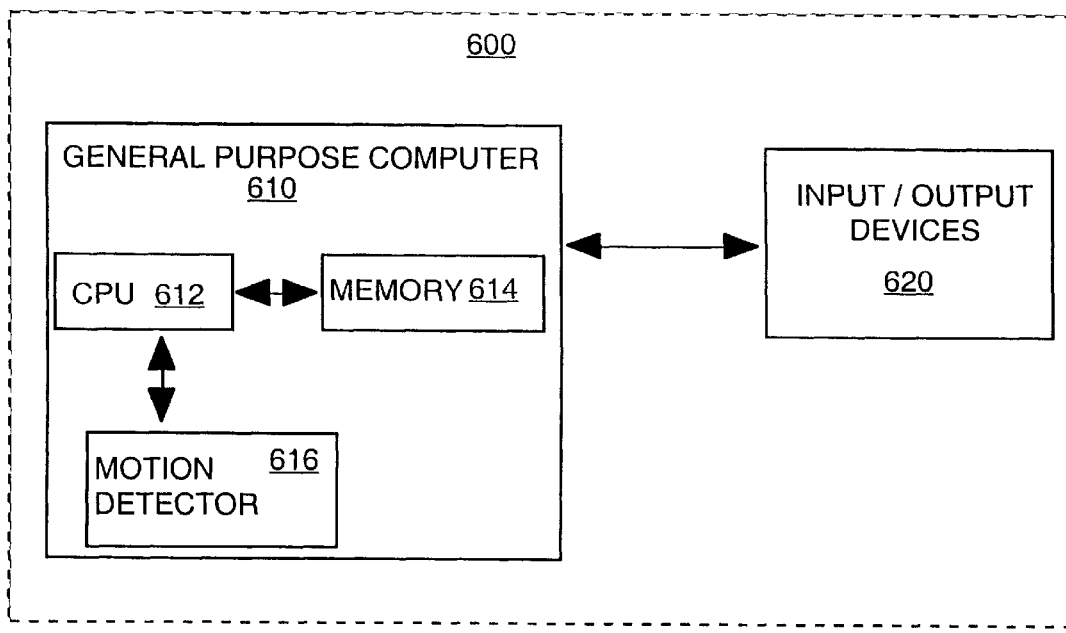
FIG. 6 illustrates a block diagram of an image processing system of the present invention implemented via a general purpose computer.

FIG. 6 illustrates a block diagram of an image processing system 600 of the present invention implemented via a general purpose computer. The image processing system 600 comprises a general purpose computer 610 and various inputloutput devices 620. The general purpose computer comprises a central processing unit (CPU) 612, a memory 614 and a motion detector 616 for detecting salient motion in a video signal.

In the preferred embodiment, the motion detector 616 is simply the motion detector 130 as discussed above in FIG. 1. The motion detector 616 can be a physical device that is coupled to the CPU 612 through a communication channel. Alternatively, the motion detector 616 can be represented by a software application (or a combination of software and hardware, e.g., using application specific integrated circuits (ASIC)), where the software is loaded from a storage medium, (e.g., a magnetic or optical drive or diskette) and operated by the CPU in the memory 614 of the computer. As such, the motion detector 616 and various methods of the present invention can be stored on a computer readable medium. Furthermore, various data structures generated by the motion detector 616, e.g., flow fields, warped images, cumulative flow and salience measures, can also be stored on a computer readable medium, e.g., RAM memory, magnetic or optical drive or diskette and the like.

The computer 610 can be coupled to a plurality of input and output devices 620, such as a keyboard, a mouse, an audio recorder, a camera, a camcorder, a video monitor, any number of imaging devices or storage devices, including but not limited to, a tape drive, a floppy drive, a hard disk drive or a compact disk drive.

Furthermore, it should be noted that although the present invention is described above with regard to the salience of a frame, the present invention can be adapted to a subset of pixels in an image frame. Namely, it should be noted that the approach may be applied, if desired, to a subset of the pixels in the image, or to externally-defined regions in the image that may be defined by the user or by another process.

Furthermore, the computation of the flow field may be restricted to certain regions of the image, which again may be defined by the user or by another process. Such a spatially restricted flow field may be thought of, in the context of the method described above, as having zero-valued flow at all pixels not inside the specified regions. Also, the flow field within these regions may be derived from a parametric motion estimator, which describes the motion for all pixels within the region as either a uniform translational motion or a function of their position within the region. The parametric motion description may be thought of, in the context of the method described above, as defining the flow vectors at each pixel within the specified region.

Furthermore, it should be noted that in some embodiments it may not be necessary to apply a warping process to generate the warped measure image, but instead, the warping process may be performed implicitly simply by combining parametric motion descriptions attached to a region in the image.

Finally, it should be noted that the images described herein need not necessarily be two-dimensional. The definitions described here can be readily extended to describe motions in a one-dimensional image using a 1-D flow field, a three-dimensional image using a 3-D flow field, etc.

Although various embodiments which incorporate the teachings of the present invention have been shown and described in detail herein, those skilled in the art can readily devise many other varied embodiments that still incorporate these teachings.

What is claimed is:

1. A method for detecting salient motion in an image sequence having a plurality of image frames, said method comprising the steps of:

(a) generating at least one motion description between two image frames from said image sequence;

(b) combining said at least one motion description with one or more intermediate accumulated motion descriptions; and (c) generating a measure of salience from said one or more intermediate accumulated motion descriptions for detecting salient motion in said image sequence.

2. The method of claim 1, wherein said at least one motion description is a flow field, wherein said one or more intermediate accumulated motion descriptions are intermediate measure image frames, and wherein said combining step (b) comprises the step of applying said at least one flow field to warp an intermediate measure image frame to generate a warped measure image.

3. The method of claim 2, wherein said generating step (a) employs multi-resolution least squares to generate said at least one flow field.

4. The method of claim 2, wherein said generating step (a) employs forwards-backwards checking to generate said at least one flow field.

5. The method of claim 2, wherein said generating step (c) generates said measure of salience from said warped measure image by generating a cumulative flow field.

6. The method of claim 5, wherein said cumulative flow field is updated to account for direction reversal.

7. The method of claim 6, wherein said direction reversal is accounted by the steps of:
   (c1) updating said cumulative flow field;
   (c2) computing a maximum cumulative flow field; and
   (c3) generating said salience measure in accordance with said updated cumulative flow field and said maximum cumulative flow field.

8. The method of claim 5, wherein said cumulative flow field is represented by:

$$_j^i C = \begin{cases} _j^i F & \text{if } j = i+1 \\ \Delta_j + \text{warp}(_{j-1}^i C, _j^{j-1} F) & \text{if } j > i+1 \end{cases}$$

where $_j^i C$ is said cumulative flow field, $_j^i F$ is said at least one flow field, $\Delta_j$ is a contribution to said cumulative flow of said at least one flow field from a frame j−1 to a frame j, and warp$(_{j-1}^i C, _j^{j-1} F)$ is said warped image.

9. The method of claim 7, wherein said updating step (c1) updates said cumulative flow field using an extended flow field.

10. The method of claim 9, wherein said updating step (c1) updates said cumulative flow field in accordance with:

$$S'_j := \begin{cases} 0 & \text{if } j = 0 \\ \Delta_j + \text{warp}(S_{j-1}, _j^{j-1} E) & \text{otherwise} \end{cases}$$

where $S'_j$ is said updated cumulative flow field, $_j^{j-1} E$ is said extended flow field, $\Delta_j$ is a contribution to said cumulative flow of said at least one flow field from a frame j−1 to a frame j, and warp$(S_{j-1}, _j^{j-1} E)$ is said warped measure image.

11. The method of claim 7, wherein said computing step (c2) computes an x-component of said maximum cumulative flow field in accordance with:

$$M_{j,x}(p) := \begin{cases} S'_{j,x}(p) & \text{if } \text{sign}(S'_{j,x}(p)) = \text{sign}(m_x) \text{ and } |S'_{j,x}(p)| > |m_x| \\ m_x & \text{otherwise} \end{cases}$$

where $M_{j,x}(p)$ is said maximiiumii cumulative flow field of said x-component for a point p, $S'_{j,x}(p)$ is said updated cumulative flow field for said x-component for a point p, and $m_x$ is a value of the x-component of a maximum cumulative flow vector at point p's location in the previous frame.

12. The method of claim 7, wherein said generating step (c3) generates an x-component of said salience measure in accordance with:

$$S_{j,x}(p) := \begin{cases} 0 & \text{if } |M_{j,x}(p)| > k_s \text{ and } |S'_{j,x}(p) - M_{j,x}(p)|/|M_{j,x}(p)| > k_r \\ S'_{j,x}(p) & \text{otherwise} \end{cases}$$

where $S_{j,x}(p)$ is said salience measure for an x-component for a point p, $M_{j,x}(p)$ is said maximum cumulative flow field of said x-component for a point p, $S'_{j,x}(p)$ is said updated cumulative flow field for said x-component for a point p, and $k_s$ and $k_r$ are constants.

13. The method of claim 5, wherein said cumulative flow field is updated in accordance with:

$$S_j = S_j \times \text{valid}(_j^{j-1} F)$$

with $$\text{valid}(F, x, y) = \begin{cases} 0 & \begin{array}{l}\text{if } \exists (x'', y'') \text{ such that} \\ |x'' - x| \leq k_d \text{ and} \\ |y'' - y| \leq k_d \text{ and} \\ \|F(x'', y'')\|/\|F(x, y)\| \\ > k_s \end{array} \\ 1 & \text{otherwise} \end{cases}$$

where $S_j$ is said updated cumulative flow field, $_j^{j-1} F$ is one of said at least one flow field, warp$(_{j-1} S, _j^{j-1} F)$ is said warped measure image, and $k_d$ and $k_s$ are constants.

14. The method of claim 1, further comprising the step of:
   (d) resetting said measure of salience to zero for a region in the image sequence.

15. An apparatus for detecting salient motion in an image sequence having a plurality of image frames, said apparatus comprising:
   a flow field generator for generating at least one flow field between two image frames from said image sequence;
   an image warper, coupled to said flow field generator, for applying said at least one flow field to warp an intermediate measure image frame to generate a warped measure image; and
   a salience measure generator, coupled to said image warper, for generating a measure of salience from said warped measure image for detecting salient motion in said image sequence.

16. The apparatus of claim 15, wherein said flow field generator employs multi-resolution least squares to generate said at least one flow field.

17. The apparatus of claim 15, wherein said flow field generator employs forwards-backwards checking to generate said at least one flow field.

18. The apparatus of claim 15, wherein said salience measure generator generates said measure of salience from said warped image by generating a cumulative flow field.

19. A computer-readable medium having stored thereon a plurality of instructions, the plurality of instructions including instructions which, when executed by a processor, cause the processor to perform the steps comprising of:
   (a) generating at least one motion description between two image frames from said image sequence;
   (b) combining said at least one motion description with one or more intermediate accumulated motion descriptions; and
   (c) generating a measure of salience from said one or more intermediate accumulated motion descriptions for detecting salient motion in said image sequence.

20. The computer-readable medium of claim 19, wherein said at least one motion description is a flow field, wherein said one or more intermediate accumulated motion descriptions are intermediate measure image frames, and wherein said combining step (b) comprises the step of applying said at least one flow field to warp an intermediate measure image fiame to generate a warped measure image.

* * * * *